Dec. 19, 1939.   W. H. CHURCHILL   2,184,249
FASTENER MEMBER AND FASTENER INSTALLATION
Filed Feb. 18, 1938
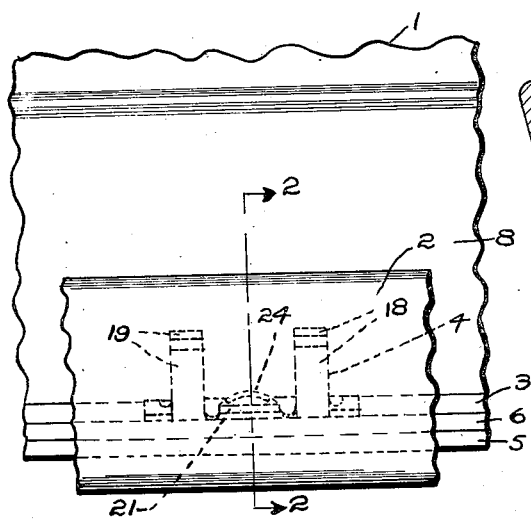
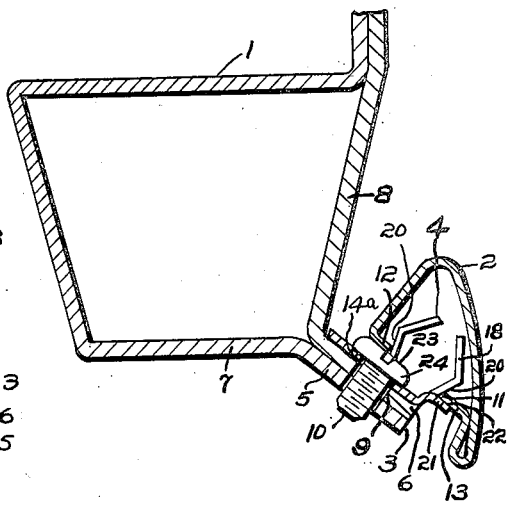
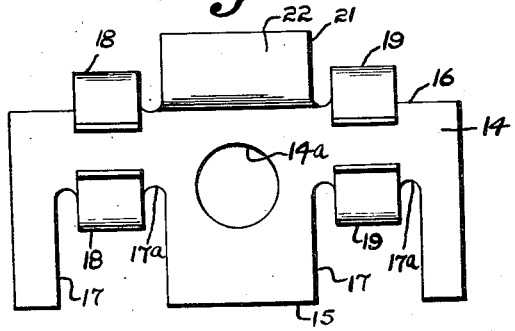
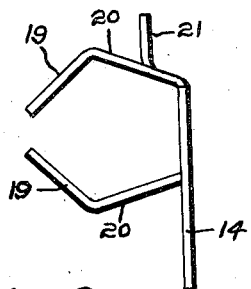
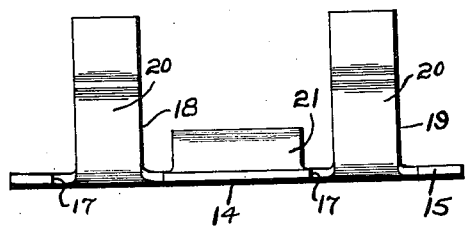
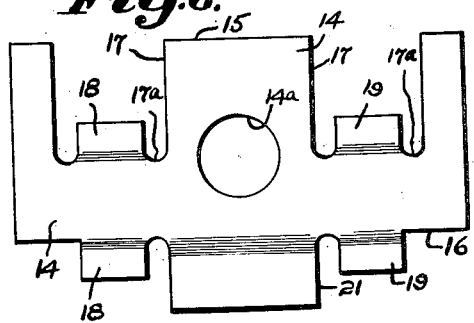
Inventor:
Wilmer H. Churchill.
by Walter S. Jones Att'y.

Patented Dec. 19, 1939

2,184,249

UNITED STATES PATENT OFFICE 2,184,249

FASTENER MEMBER AND FASTENER INSTALLATION

Wilmer H. Churchill, Saugus, Mass., assignor to United-Carr Fastener Corporation, Cambridge, Mass., a corporation of Massachusetts Application February 18, 1938, Serial No. 191,242

4 Claims. (Cl. 189—88)

My invention relates to improvements in snap fastener members of the type particularly, though not exclusively, adapted for securing a molding strip to a support and installations of the same.

Referring to the drawing, in which I have illustrated a preferred form of my invention—

Figure 1 is a front plan view of an installation showing a molding strip secured to a supporting structure by means of my improved fastener;

Fig. 2 is a section taken along the line 2—2 of Fig. 1;

Fig. 3 is an enlarged top view of my improved fastener member per se;

Fig. 4 is an end view of my improved fastener member per se;

Fig. 5 is a front view of my improved fastener member per se; and

Fig. 6 is a bottom view of my improved fastener member per se.

My invention, as illustrated in the accompanying drawing, relates to a snap fastener member which may be preferably used for fastener secured installations in which an article of manufacture, such as a hollow molding and the like, is quickly and efficiently secured to a supporting structure, such as a part of the frame of an automobile body. The particular installation shown in the drawing which I have chosen to illustrate the use of my improved fastener member comprises a frame 1 of an automobile body and a hollow molding strip 2 secured to a supporting structure 3 forming a part of the frame 1 by means of my improved fastener member 4. The frame 1, in my preferred form, is of four-sided cross-sectional shape and has relatively short extensions 5 and 6 of respective adjacent sides 7 and 8 forming a relatively narrow supporting structure 3 (Fig. 2) disposed outside the four-sided cross-sectional area. The portions 5 and 6 are disposed in superposed adjacent relation and have an aperture 9 (Fig. 2) extending therethrough. The aperture 9 is preferably internally threaded for receiving a threaded shank of a screw member 10 which serves, in my preferred installation, to attach the fastener member 4 to the supporting structure 3, as will be hereinafter more fully described. The molding strip 2 may be of any suitable cross-sectional shape and has a longitudinal opening 11 running the entire length thereof and inwardly-bent flanges 12 and 13 adjacent the opening 11 (Fig. 2).

Referring to my preferred form of fastener member, I have shown one of one-piece construction in which the fastener has a relatively flat base 14 providing opposed edges 15 and 16. The base 14, in my preferred form, has a pair of openings 17—17 extending toward the edge 16 from the edge 15 and an aperture 14a preferably formed intermediate the openings 17—17, as most clearly shown in Figs. 3 and 6. The base 14 has two sets of attaching portions, each of which comprises a pair of opposed yieldable arms 18—18 and 19—19 respectively. One arm of each of the respective pairs 18—18 and 19—19 is integrally joined to the most inwardly-disposed edge 17a of the respective opening 17 while the other arm is integrally joined to the edge 16 of the base. The arms of each of the respective pairs 18—18 and 19—19 diverge from the base 14 and then converge toward their free ends providing shoulders 20—20 for snap fastener engagement with the flanges 12 and 13 of the molding strip 2 through the opening 11 thereof. Integral with the edge 16 of the base 14 intermediate the pairs of arms I have formed a lip portion 21 having a flat upper surface 22 disposed above the normal plane of the base 14 in substantially parallel relation thereto. The upper surface 22 of the lip 21 is disposed above the base 14, in my preferred form, a distance substantially equal to the distance of the top surface 23 of the screw head 24 of the screw member 10 from the base 14 and is adapted to cooperate with the surface 23 of the screw head to support the flanges 12 and 13 of the molding strip 2.

In assembling the parts of my installation the base 14 of the fastener member is disposed on the upper surface of the portion 6 of the frame with the aperture 14a of the base in registry with the opening 9 of the supporting structure 3. When the fastener is in this position the relative dimensions of the fastener member and the support 3, in my preferred installation, cause the edge 15 of the fastener to be located substantially adjacent the outer surface of the side 8 of the frame 1 and the edge 16 in substantial registry with the free edges of the portions 5 and 6 of the supporting structure 3. At the same time the lip 21 extends beyond the free edges of the portions 5 and 6, as most clearly shown in Fig. 2. Next, the fastener member is secured to the support through means of the screw member 10 having its shank in cooperating threaded engagement with the aperture 9 and its head 24 engaging an upper surface of the base 14. Thus, after the fastener member has been finally secured to the support, the broad surface 22 of the lip 21 and the top 23 of the screw head 24 are disposed at substantially equal distances from the base 14 of the fastener member. Finally, the molding strip 2 is secured to the fastener member through snapping the flanges 12 and 13 over the shoulders 20—20 of the pairs of spring arms 18—18 and 19—19. When the molding strip is in final assembly with the fastener member, the flange 12 is supported by the top surface 23 of the screw head 24 and the flange 13 is supported by the upper surface 22 of the lip 21. Thus it will be seen that by constructing the fastener member so as to have the lip 21 disposed above the normal plane of the base of the fastener member, a means is provided cooperating with the screw head 24 to maintain flanges of the molding strip in substantially parallel relation to the base 14 of the fastener member.

Although I have illustrated and described a preferred embodiment of my invention, I do not wish to be limited thereby because the scope of my invention is best defined in the following claims.

I claim:

1. A fastener member having a base and a pair of yieldable arms extending therefrom, the arms of said pair extending from opposed free edges of said base, said arms having diverging and converging portions for engagement with another part through an opening thereof, said base having an integral lip portion extending beyond one of its free edges and disposed above the normal plane of said base for supporting said part, and said base having an opening for receiving an attaching means to secure said base to a supporting structure.

2. A fastener member having a base and a pair of openings at one side thereof, two pairs of yieldable arms extending from said base for fastener engagement with another part through an opening thereof, each of said pairs having one arm integral with said base adjacent an edge of one of said openings therein and the other arm integral with an edge of said base spaced from the edge of said opening, said base having a lip portion disposed above the normal plane of said base for supporting said part, and said base having an opening for receiving an attaching means to secure said fastener to a supporting structure.

3. A fastener installation comprising a supporting structure, an article of manufacture having an opening, a fastener member having a base in engagement with said supporting structure, yieldable portions extending from said base in fastener engagement with said article through said opening whereby said article is secured to said support, attaching means extending through said base for securing said fastener member to said support, said attaching means having a portion extending above the normal plane of said base in supporting engagement with said article.

4. A fastener installation comprising a supporting structure, an article of manufacture having an opening, a fastener member having a base in engagement with said supporting structure, yieldable portions extending from said base in fastener engagement with said article through said opening whereby said article is secured to said support, attaching means extending through said base for securing said fastener member to said support, said attaching means having a head portion extending above the normal plane of said base in supporting engagement with said article, and said base having an integral portion in supporting engagement with said article, said integral portion being disposed above the normal plane of said base a distance substantially equal to the height of the head portion of said attaching means above the same.

WILMER H. CHURCHILL.